(12) United States Patent
Zameroski

(10) Patent No.: US 10,472,080 B2
(45) Date of Patent: Nov. 12, 2019

(54) HELICOPTER ENGINE MOUNTING ASSEMBLY

(71) Applicant: LORD Corporation, Cary, NC (US)

(72) Inventor: Daniel Zameroski, McKean, PA (US)

(73) Assignee: LORD Corporation, Cary, NC (US)

( * ) Notice: Subject to any disclaimer, the term of this patent is extended or adjusted under 35 U.S.C. 154(b) by 235 days.

(21) Appl. No.: 15/602,946

(22) Filed: May 23, 2017

(65) Prior Publication Data

US 2017/0259930 A1 Sep. 14, 2017

Related U.S. Application Data

(62) Division of application No. 14/563,539, filed on Dec. 8, 2014, now Pat. No. 9,663,235, which is a division
(Continued)

(51) Int. Cl.
*B64D 27/00* (2006.01)
*B64D 27/26* (2006.01)
(Continued)

(52) U.S. Cl.
CPC ............ *B64D 27/26* (2013.01); *B64C 27/001* (2013.01); *B64F 5/10* (2017.01); *F16F 13/26* (2013.01);
(Continued)

(58) Field of Classification Search
CPC .............. B64D 27/26; B64D 2027/262; B64D 2027/266; B64C 27/001; B64C 2027/005; B64F 5/10; F16F 13/26
USPC ....... 248/554, 562, 550, 564, 584, 631, 637, 248/67, 557, 638, 671; 267/136, 140.11; 244/54, 55, 53 R, 58, 60; 280/79.6
See application file for complete search history.

(56) References Cited

U.S. PATENT DOCUMENTS

| 4,326,682 A | * | 4/1982 | Nightingale | ........... B64D 27/26 244/54 |
| 4,717,094 A | * | 1/1988 | Chee | ...................... B64D 27/18 244/54 |

(Continued)

FOREIGN PATENT DOCUMENTS

| FR | 2939409 | 6/2010 |
| GB | 2049817 | 12/1980 |

OTHER PUBLICATIONS

Depriest, Jesse, Lord Corporation, Aircraft Engine Attachment and Vibration Control, LL-6505, 2001, 20 pgs.
(Continued)

*Primary Examiner* — Tan Le

(57) ABSTRACT

An engine mount assembly for mounting an engine which produces a torque to a body having a persistent troublesome frequency vibration is disclosed. The engine mount assembly includes two fluid elastomeric chambers groundable to the body, an intermediate cradle link disposed between the two fluid chambers, a lateral link grounded to the body and the intermediate cradle, and a fluid conduit connecting the two fluid chambers. When subjected to torque a positive fluid pressure is generated within the fluid chambers and fluid conduit with the two fluid chambers share a plurality of loads while a transfer of the persistent troublesome frequency vibration from the body to the engine is inhibited.

9 Claims, 14 Drawing Sheets

Related U.S. Application Data of application No. 13/159,855, filed on Jun. 14, 2011, now Pat. No. 8,905,368.

(60) Provisional application No. 61/397,607, filed on Jun. 14, 2010.

(51) Int. Cl.
  *F16M 13/00* (2006.01)
  *F16F 13/26* (2006.01)
  *B64F 5/10* (2017.01)
  *B64C 27/00* (2006.01)

(52) U.S. Cl.
  CPC .. *B64C 2027/005* (2013.01); *B64D 2027/262* (2013.01); *B64D 2027/266* (2013.01); *Y10T 29/49826* (2015.01)

(56) References Cited

U.S. PATENT DOCUMENTS

| | | | |
|---|---|---|---|
| 4,969,632 A | 11/1990 | Hodgson et al. | |
| 5,127,607 A | 7/1992 | McGuire | |
| 5,238,206 A | 8/1993 | Pachomoff | |
| 5,351,930 A | 10/1994 | Gwinn et al. | |
| 5,388,811 A | 2/1995 | Marjoram | |
| 5,649,417 A | 7/1997 | Hey | |
| 5,788,372 A | 8/1998 | Jones et al. | |
| 5,860,623 A | 1/1999 | Dunstan et al. | |
| 5,918,833 A * | 7/1999 | Najand | B60K 5/1208 244/54 |
| 6,059,227 A | 5/2000 | Le Blaye et al. | |
| 6,330,995 B1 * | 12/2001 | Mangeiga | B64D 27/26 244/54 |
| 6,986,482 B2 | 1/2006 | Brefort et al. | |
| 7,909,302 B2 | 3/2011 | Audart-Noel et al. | |
| 7,918,146 B2 | 4/2011 | Gmirya | |
| 8,646,724 B2 | 2/2014 | Bonnet et al. | |
| 8,905,368 B2 * | 12/2014 | Zameroski | B64D 27/26 248/554 |
| 9,663,235 B2 * | 5/2017 | Zameroski | B64D 27/26 |
| 9,889,943 B2 * | 2/2018 | Ewens | B64D 27/26 |

OTHER PUBLICATIONS

Herbst, Paul T., et al., LORD Corporation, The Application of Fluidlastic Isolators on Turbofan Engines, LL-6400, 1996, 9 pgs.
McGuire, Dennis P., LORD Corporation, Fluidlastic Dampers and Isolators for Vibration Control in Helicopters, LL-6502, 1994, 10 pgs.
Smith, Michael R., et al., The Model 427 Pylon Isolation System, 7 pgs.
LORD Aerospace Products, Fluidlastic Technology, 1991, 8 pgs.
LORD Mechanical Products, Vibration, Shock, Motion and Noise Control, Rotary Wing Aircraft Products, 1994, 12 pgs.
Wikipedia Org, Inertance, http://en.wikipedia.org/wiki/Inertance, Jun. 10, 2011, 2 pgs.

* cited by examiner

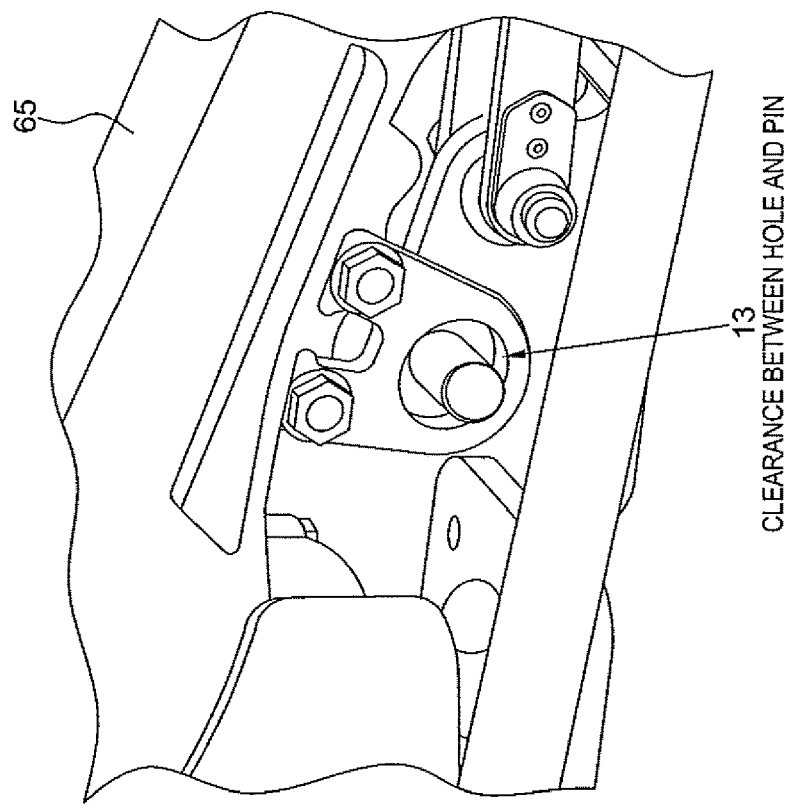
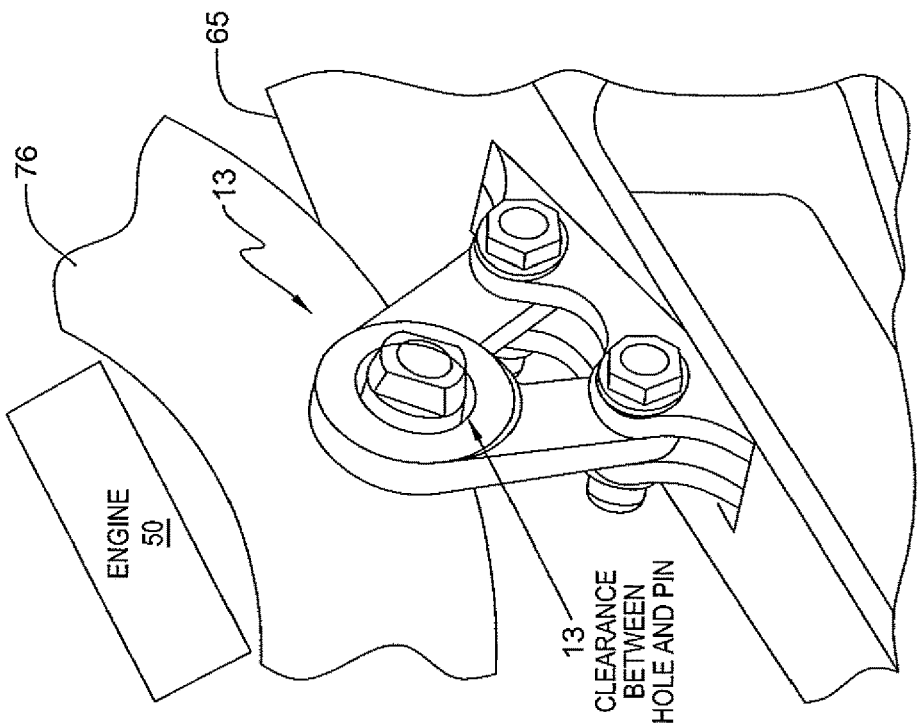
WAITING FAILSAFES
FIG. 13

HELICOPTER ENGINE MOUNTING ASSEMBLY

This patent application is a divisional application of U.S. application Ser. No. 13/159,855, filed Jun. 14, 2011, now U.S. Pat. No. 8,905,368, issued Dec. 9, 2014, and this patent application is also a divisional application of U.S. application Ser. No. 14/563,539, filed on Dec. 8, 2014, both of which claim the benefit of, and incorporate by reference, U.S. Provisional Application No. 61/397,607 filed on Jun. 14, 2010, all of which are incorporated herein by reference in their entireties.

FIELD OF THE INVENTION

The invention relates to the field of rotary wing aircraft. The invention relates to the field of rotary wing aircraft engine mounting systems. More particularly the invention relates to the field of mounting aircraft engines in rotary wing aircrafts that have persistent in flight operational rotating frequency vibrations.

SUMMARY OF THE INVENTION

In an embodiment the invention includes a method of mounting an engine in a rotary wing aircraft. The method includes providing a rotary wing aircraft having an aircraft body supported in flight through an exterior air space by a rotary wing system rotating with an operational rotating frequency (P) with a plurality of (N) rotary wings, the rotary wing aircraft body having a persistent in flight operational rotating frequency vibration. The method includes providing a first engine, the first engine for providing power to rotate the rotary wing system at the rotary wing system operational rotating frequency (P). The method includes providing a top fluid chamber fluid elastomer engine mount and a bottom fluid chamber fluid elastomer engine mount, the top fluid chamber fluid elastomer engine mount having a bottom end for grounding to the aircraft body, and the bottom fluid chamber fluid elastomer engine mount having a bottom end for grounding to the aircraft body. The top fluid chamber fluid engine mount having a top fluid chamber distal from the top fluid chamber fluid engine mount bottom end, the bottom fluid chamber fluid engine mount having a bottom fluid chamber proximate the bottom fluid chamber fluid engine mount bottom end. The method includes providing an intermediate cradle. The method includes providing a lateral link, the lateral link having a first end for grounding to the aircraft body and a second distal end, the second distal end distal from the first end. The method includes mounting the first engine to the aircraft body, with the top fluid chamber fluid elastomer engine mount bottom end grounded to the aircraft body, the bottom fluid chamber fluid elastomer engine mount bottom end grounded to the aircraft body, with the intermediate cradle disposed between the top fluid chamber fluid elastomer engine mount and the bottom fluid chamber fluid elastomer engine mount and the first engine, with a fluid conduit connecting the top fluid chamber fluid engine mount top fluid chamber with the bottom fluid chamber fluid engine mount bottom fluid chamber wherein the rotary wing aircraft body persistent in flight operational rotating frequency vibration is inhibited from reaching the first engine. The mounting system preferably provides static determancy wherein preferably all loads can be calculated by hand calculations of force, moment, and balance.

In an embodiment the invention includes a helicopter engine mounting system for mounting an engine to an aircraft body supported in flight by a rotary wing system rotating with an operational rotating frequency (P) with a plurality of (N) rotating blades, the aircraft body having a persistent in flight operational rotating frequency vibration from the rotating blades. The engine mounting system includes a top fluid chamber fluid elastomer engine mount and a bottom fluid chamber fluid elastomer engine mount, the top fluid chamber fluid elastomer engine mount having a bottom end for grounding to the aircraft body, and the bottom fluid chamber fluid elastomer engine mount having a bottom end for grounding to the aircraft body, the top fluid chamber fluid elastomer engine mount having a top fluid chamber distal from the top fluid chamber fluid elastomer engine mount bottom end, the bottom fluid chamber fluid elastomer engine mount having a bottom fluid chamber proximate the bottom fluid chamber fluid elastomer engine mount bottom end. The engine mounting system includes an intermediate cradle with a lateral link, the lateral link having a first end for grounding to the aircraft body and a second distal end, the second distal end distal from the first end, the second distal end linked to the intermediate cradle. The top fluid chamber fluid elastomer engine mount bottom end grounded to the aircraft body, the bottom fluid chamber fluid elastomer engine mount bottom end grounded to the aircraft body, with the intermediate cradle disposed between the top fluid chamber fluid elastomer engine mount and the bottom fluid chamber fluid elastomer engine mount and the engine, with a fluid conduit connecting the top fluid chamber fluid engine mount top fluid chamber with the bottom fluid chamber fluid engine mount bottom fluid chamber wherein a transfer of the persistent in flight operational rotating frequency vibration from the aircraft body to the engine is inhibited. The mounting system preferably provides static determancy wherein preferably all loads can be calculated by hand calculations of force, moment, and balance.

In an embodiment the invention includes a method of making an engine mounting system for an engine in an aircraft body having a persistent in flight operational rotating frequency vibration. The method includes providing a top fluid chamber fluid elastomer engine mount and a bottom fluid chamber fluid elastomer engine mount, the top fluid chamber fluid elastomer engine mount having a bottom end for grounding to the aircraft body, and the bottom fluid chamber fluid elastomer engine mount having a bottom end for grounding to the aircraft body, the top fluid chamber fluid elastomer engine mount having a top fluid chamber distal from the top fluid chamber fluid elastomer engine mount bottom end, the bottom fluid chamber fluid elastomer engine mount having a bottom fluid chamber proximate the bottom fluid chamber fluid elastomer engine mount bottom end. The method includes providing an intermediate cradle with a center cradle revolute joint. The method includes providing a lateral link, the lateral link having a first end for grounding to the aircraft body and a second distal end, the second distal end distal from the first end for linking to the intermediate cradle. The method includes the intermediate cradle attachable between the engine and the top fluid chamber fluid engine mount bottom end and the bottom fluid chamber fluid engine mount bottom end with the intermediate cradle center cradle revolute joint between the top fluid chamber fluid engine mount and the bottom fluid chamber fluid engine mount with a fluid conduit connecting the top fluid chamber fluid engine mount top fluid chamber with the bottom fluid chamber fluid engine mount bottom fluid chamber wherein the aircraft body persistent in flight operational rotating frequency vibration is inhibited from reaching the engine by a mass of fluid resonating between the top fluid chamber fluid engine mount top fluid chamber and the bottom fluid chamber fluid engine mount bottom fluid chamber. The mounting system preferably provides static determancy wherein preferably all loads can be calculated by hand calculations of force, moment, and balance.

In an embodiment the invention includes an engine mount assembly for mounting an engine which produces a torque to an aircraft body having a persistent troublesome frequency vibration. The engine mount assembly including a first side fluid chamber fluid elastomer engine mount and a second side fluid chamber fluid elastomer engine mount, the first side fluid chamber fluid elastomer engine mount groundable to the body having the persistent troublesome frequency vibration, and the second side fluid chamber fluid elastomer engine mount groundable to the body having the persistent troublesome frequency vibration, the first side fluid chamber fluid elastomer engine mount having a first fluid chamber, the second side fluid chamber fluid elastomer engine mount having a second fluid chamber. The engine mount assembly including an intermediate cradle with a lateral link, the lateral link having a first end for grounding to the body having the persistent troublesome frequency vibration and a second distal end, the second distal end distal from the first end, the second distal end linked to the intermediate cradle. The first side fluid chamber fluid elastomer engine mount is grounded to the body having the persistent troublesome frequency vibration, the second side fluid chamber fluid elastomer engine mount grounded to the body having the persistent troublesome frequency vibration, with the intermediate cradle disposed between the first fluid chamber fluid engine mount and the second side fluid chamber fluid engine mount and the engine, with a fluid conduit connecting the first side fluid chamber fluid engine mount fluid chamber with the second side fluid chamber fluid engine mount fluid chamber wherein the torque generates a positive fluid pressure within the fluid chambers and the fluid conduit and the intermediate cradle has an intermediate cradle center cradle joint between the first side fluid chamber fluid elastomer engine mount and the second side fluid chamber fluid elastomer engine mount with the first side fluid chamber fluid elastomer engine mount and the second side fluid chamber fluid elastomer engine mount sharing a plurality of loads while a transfer of the persistent troublesome frequency vibration from the body to the engine is inhibited. The mounting system preferably provides static determancy wherein preferably all loads can be calculated by hand calculations of force, moment, and balance.

In an embodiment the invention includes a method of making a mounting system for mounting a subject. The method includes providing a top fluid chamber fluid mount and a bottom fluid chamber fluid mount, said top fluid chamber fluid mount having a bottom end for grounding to a body, and said bottom fluid chamber fluid mount having a bottom end for grounding to said body, said top fluid chamber fluid mount having a top fluid chamber distal from said top fluid chamber fluid mount bottom end, said bottom fluid chamber fluid mount having a bottom fluid chamber proximate said bottom fluid chamber fluid mount bottom end. The method includes providing an intermediate cradle with a center cradle revolute joint. The method includes providing a lateral link, said lateral link having a first end for grounding to said body and a second distal end, said second distal end distal from said first end for linking to said intermediate cradle, said intermediate cradle attachable between said subject and said top fluid chamber fluid mount and said bottom fluid chamber fluid mount with said intermediate cradle center cradle revolute joint between said top fluid chamber fluid mount and said bottom fluid chamber fluid mount with a fluid conduit connecting said top fluid chamber fluid mount top fluid chamber with said bottom fluid chamber fluid mount bottom fluid chamber wherein frequency notch vibrations are inhibited from transmission through said mounting system mounting said subject to said body by a mass of fluid moving between said top fluid chamber fluid mount top fluid chamber and said bottom fluid chamber fluid mount bottom fluid chamber. The mounting system preferably provides static determancy wherein preferably all loads can be calculated by hand calculations of force, moment, and balance.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 13 illustrates waiting fail safes of an engine mounting system.

DETAILED DESCRIPTION OF THE PREFERRED EMBODIMENT

Figure 1:
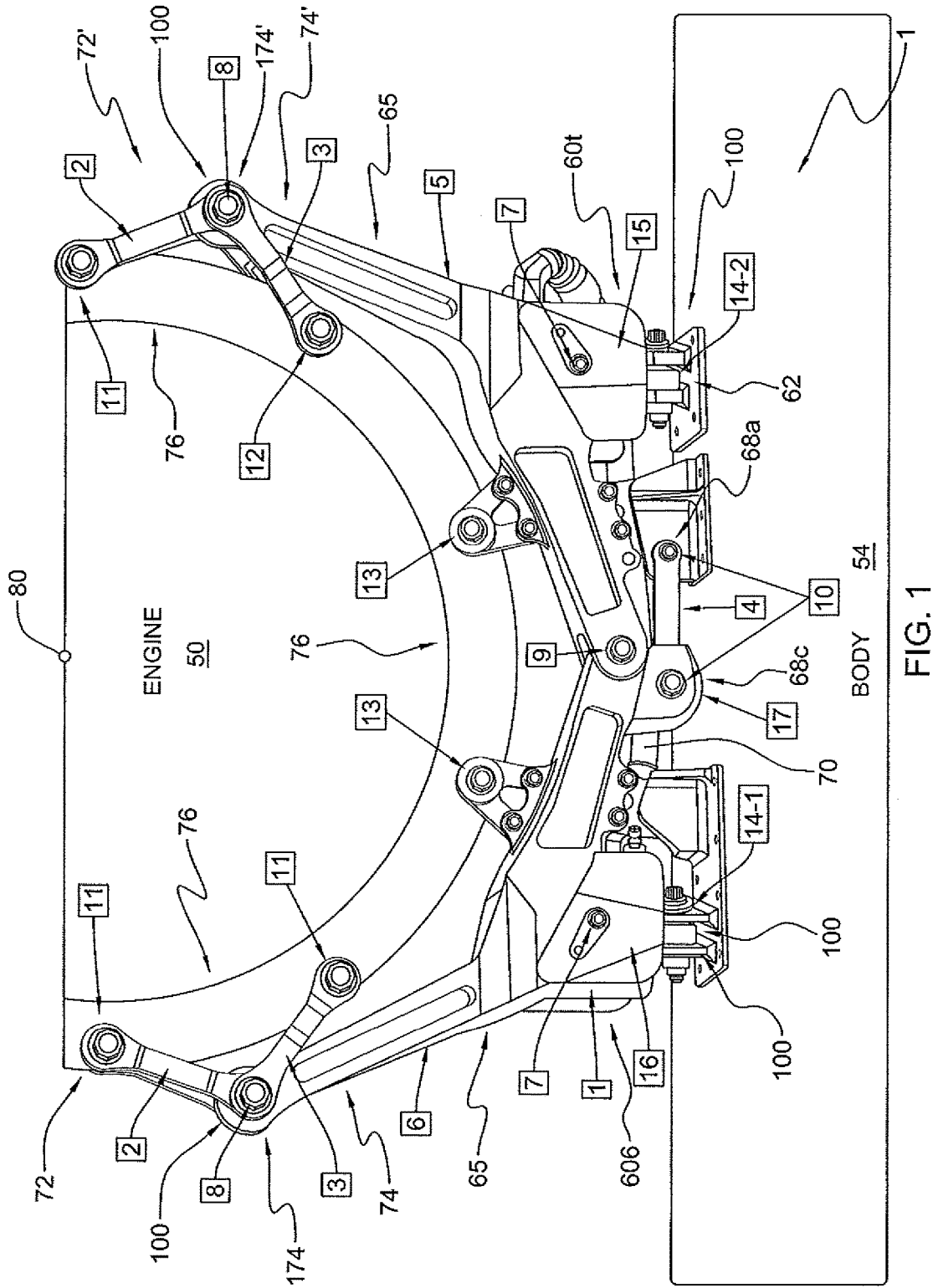
FIG. 1 illustrates an engine mounting system.
Figure 2:
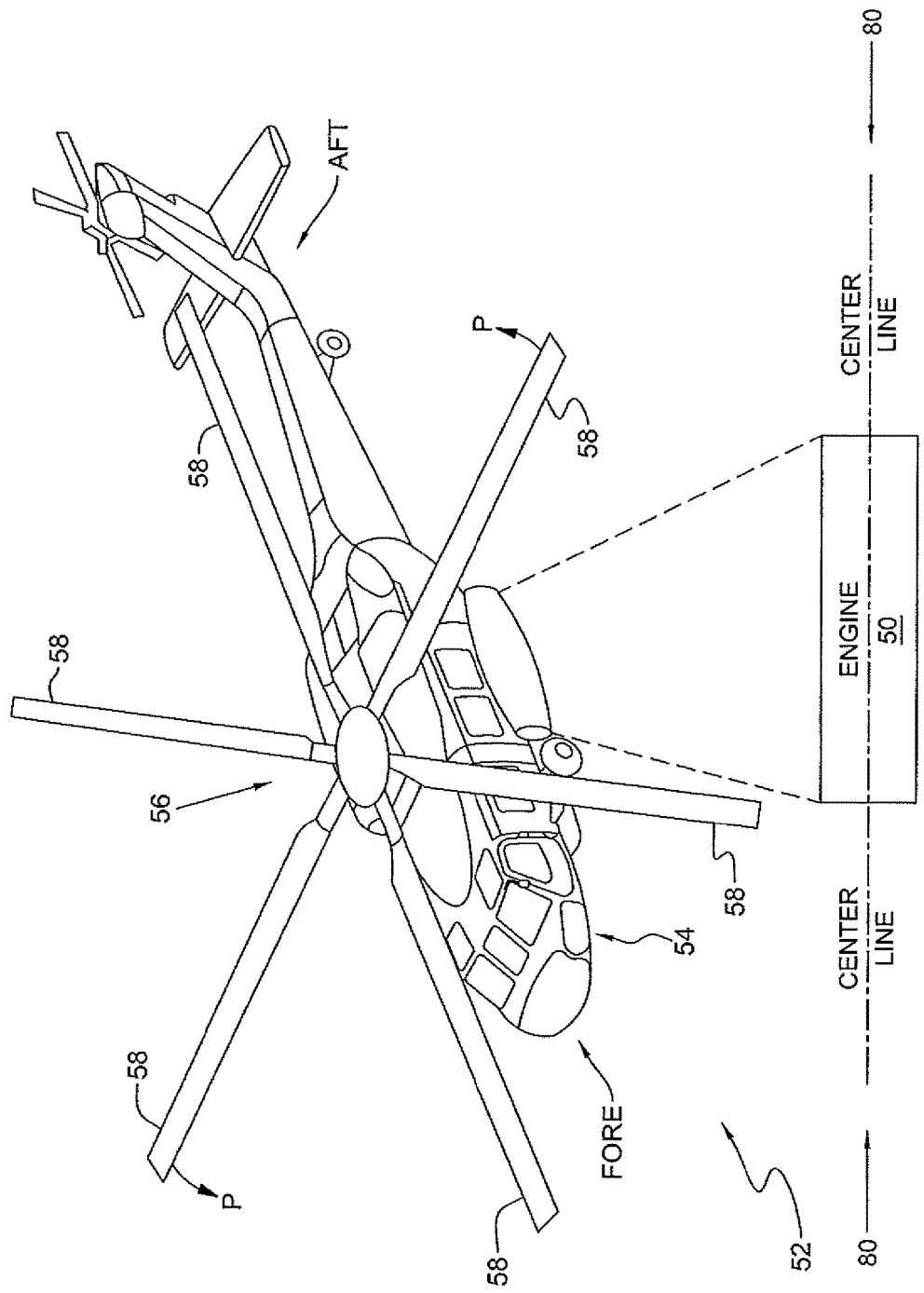
FIG. 2 illustrates a rotary wing aircraft engine mounting system with the engine mounting system center line oriented in relationship to the fore and aft of the helicopter.
Figure 3:
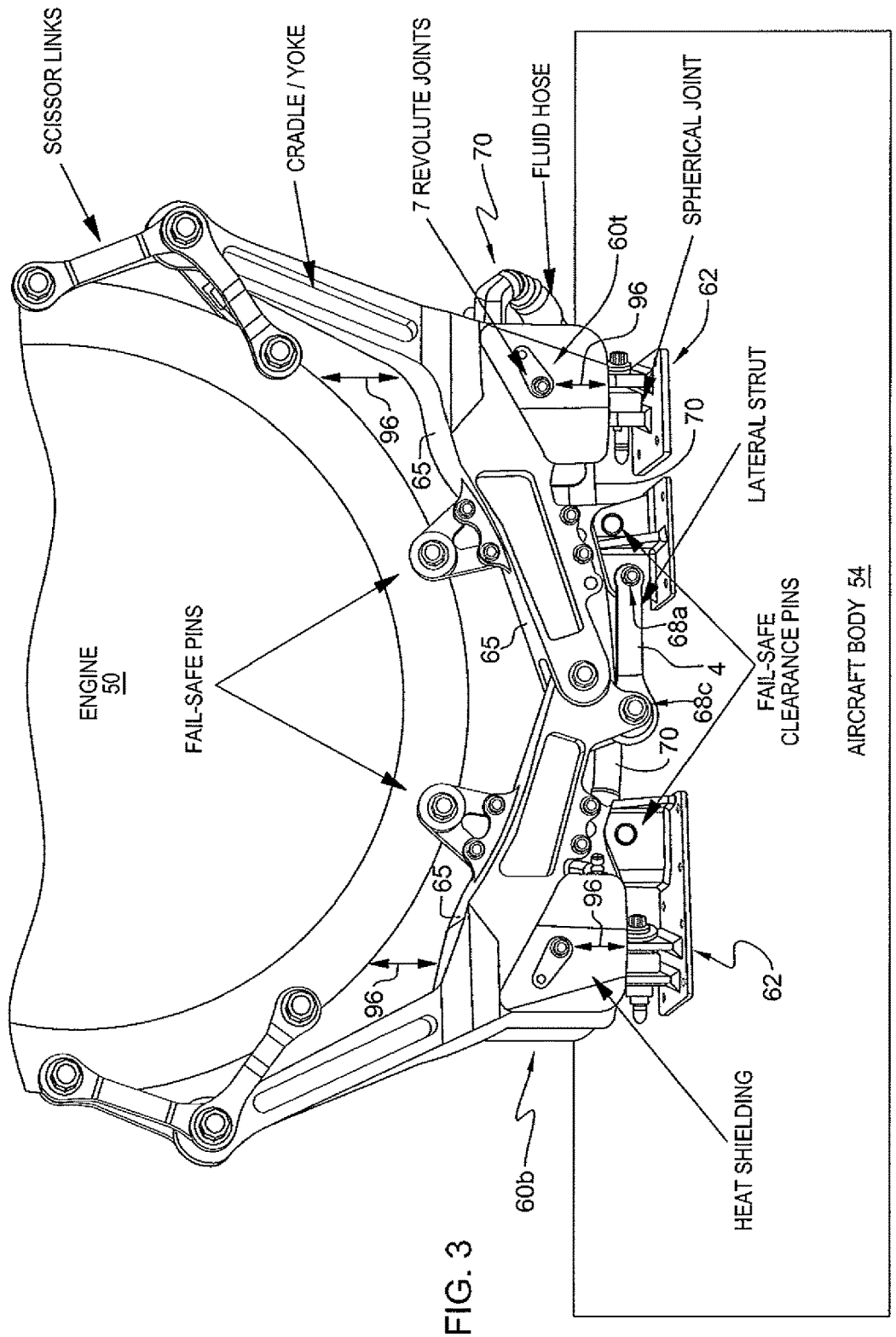
FIG. 3 illustrates a rotary wing aircraft engine mounting system.
Figure 4:
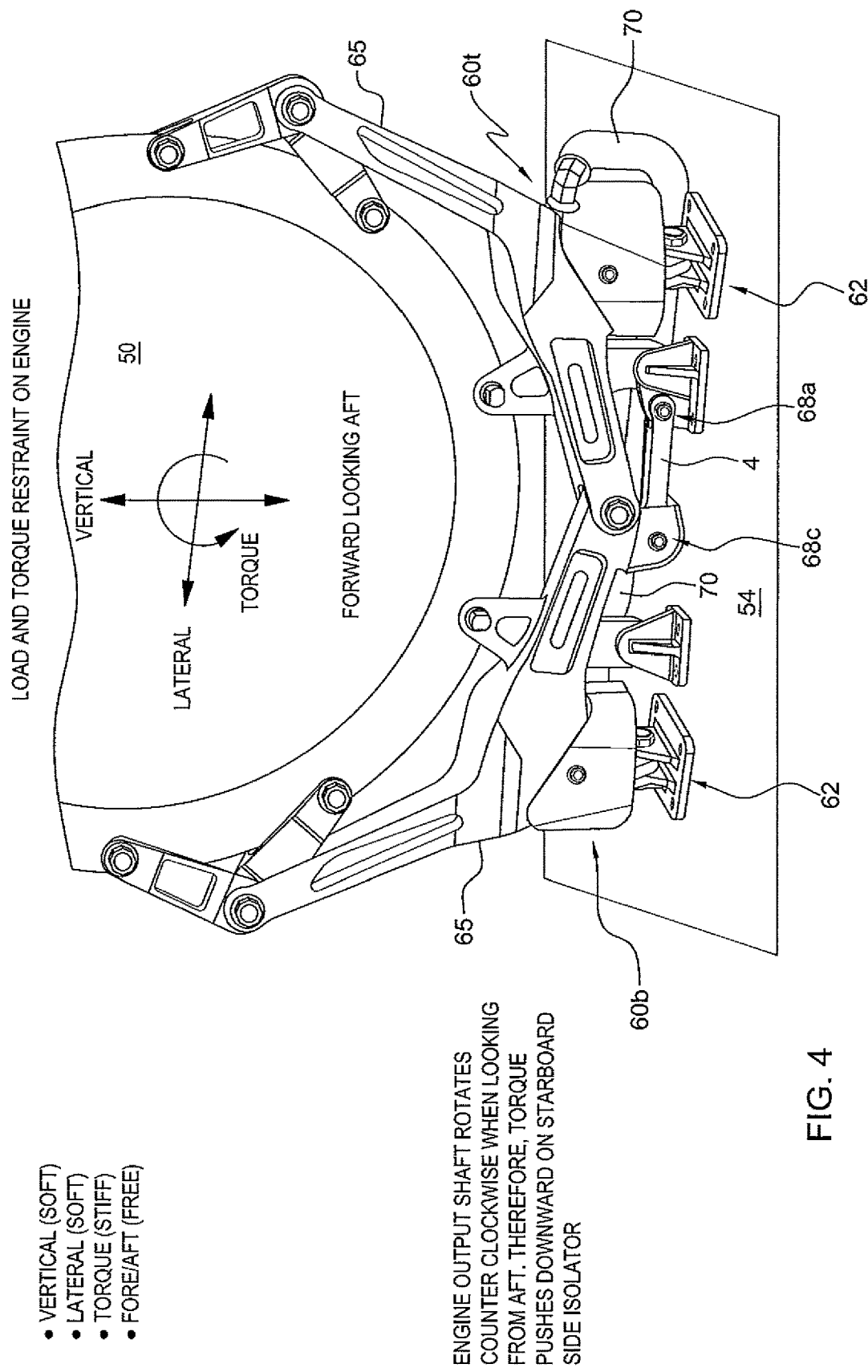
FIG. 4 illustrates the rotary wing aircraft engine mounting system and shows the vertical, lateral, fore/aft and torque orientations of the engine mounting system in the aircraft.
Figure 5:
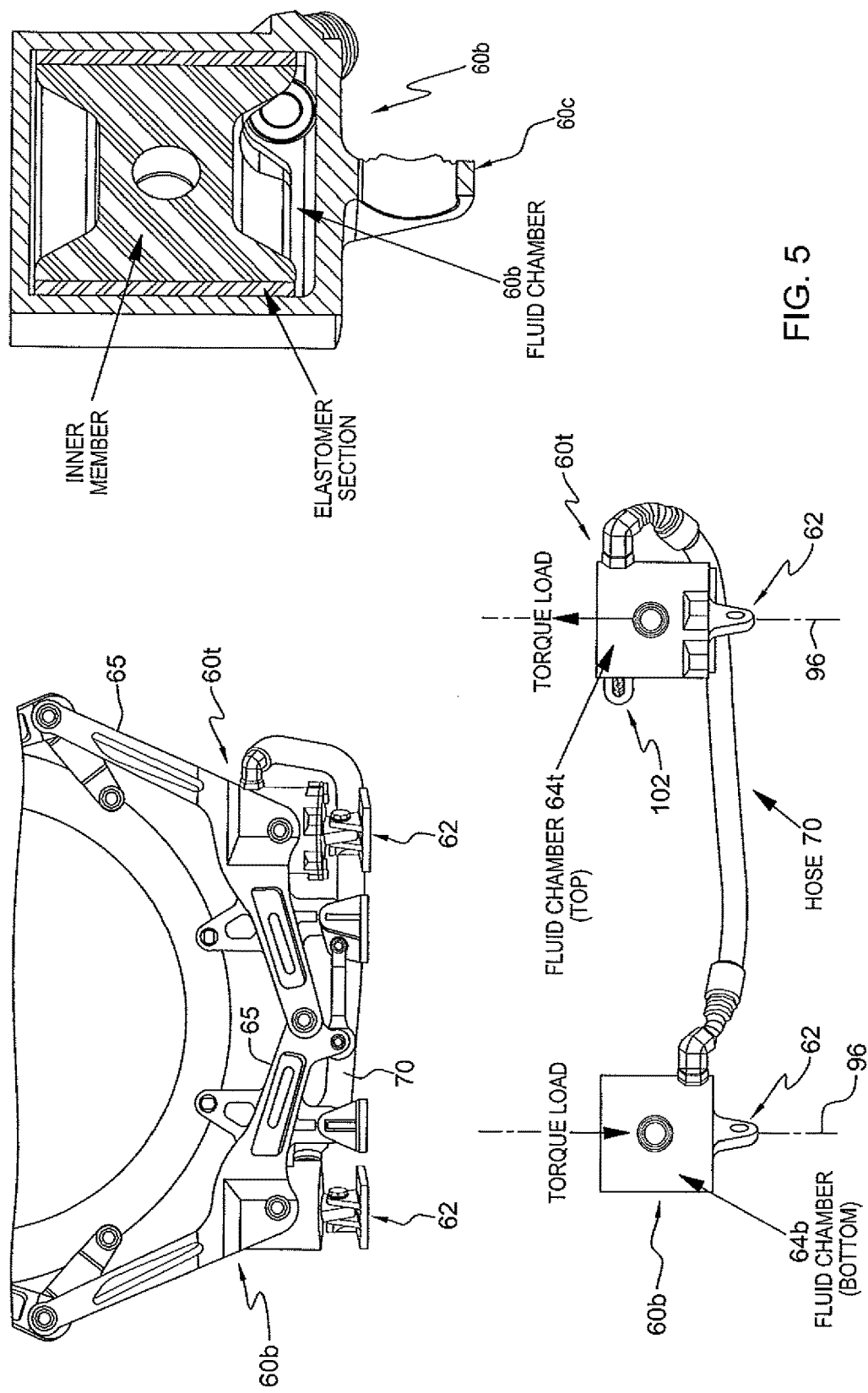
FIG. 5 illustrates the engine mounting system and shows the toque loading of connected fluid mounts and an internal cross section of a fluid mount.
Figure 6:
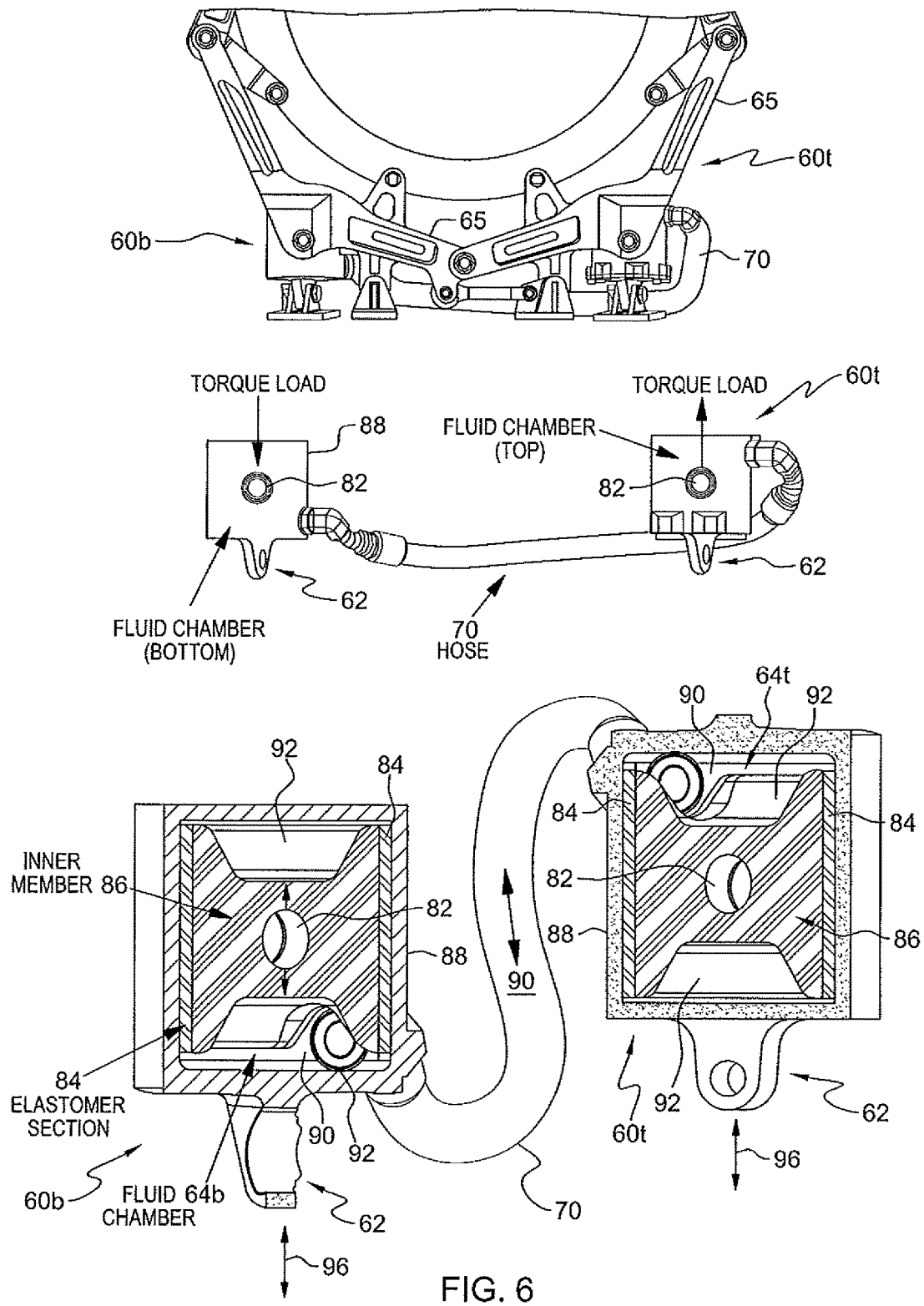
FIG. 6 illustrates the engine mounting system and shows the toque loading of connected fluid mounts and cross sections of the two connected fluid mounts and the movement of fluid between the connected fluid mounts.
Figure 7:
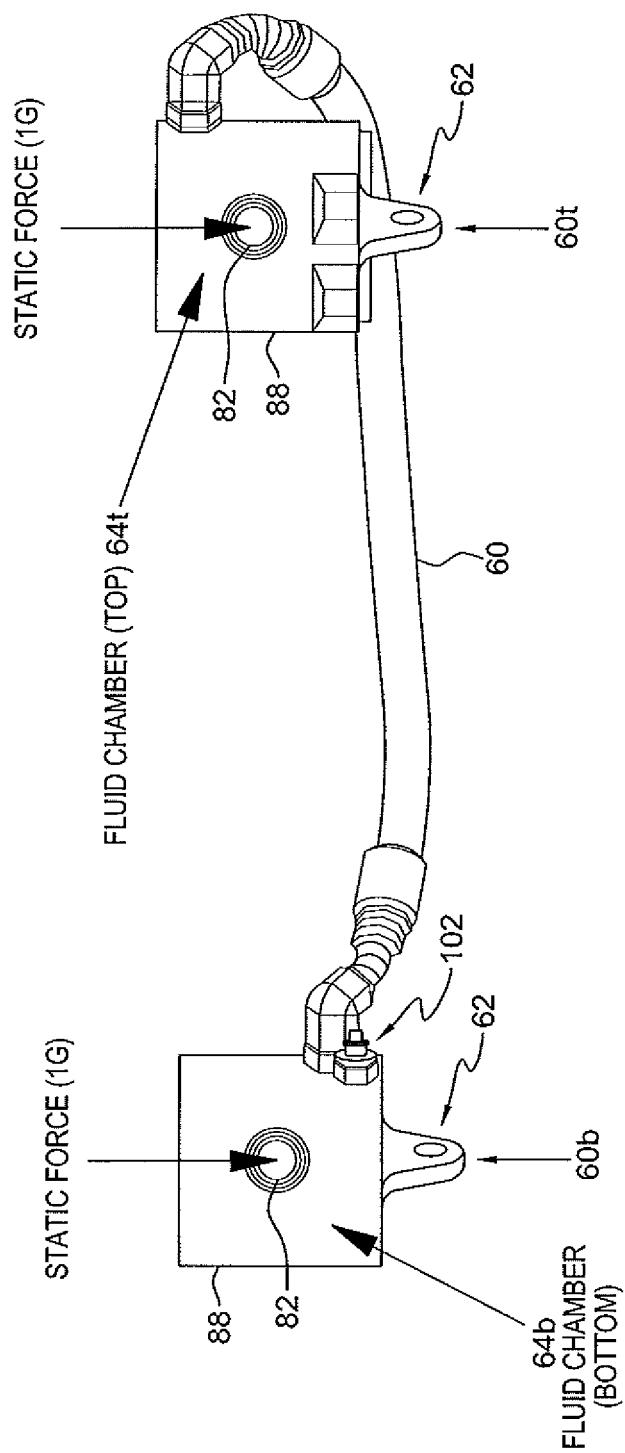
FIG. 7 illustrates two connected fluid mounts with a 1 G static force applied.
Figure 8:
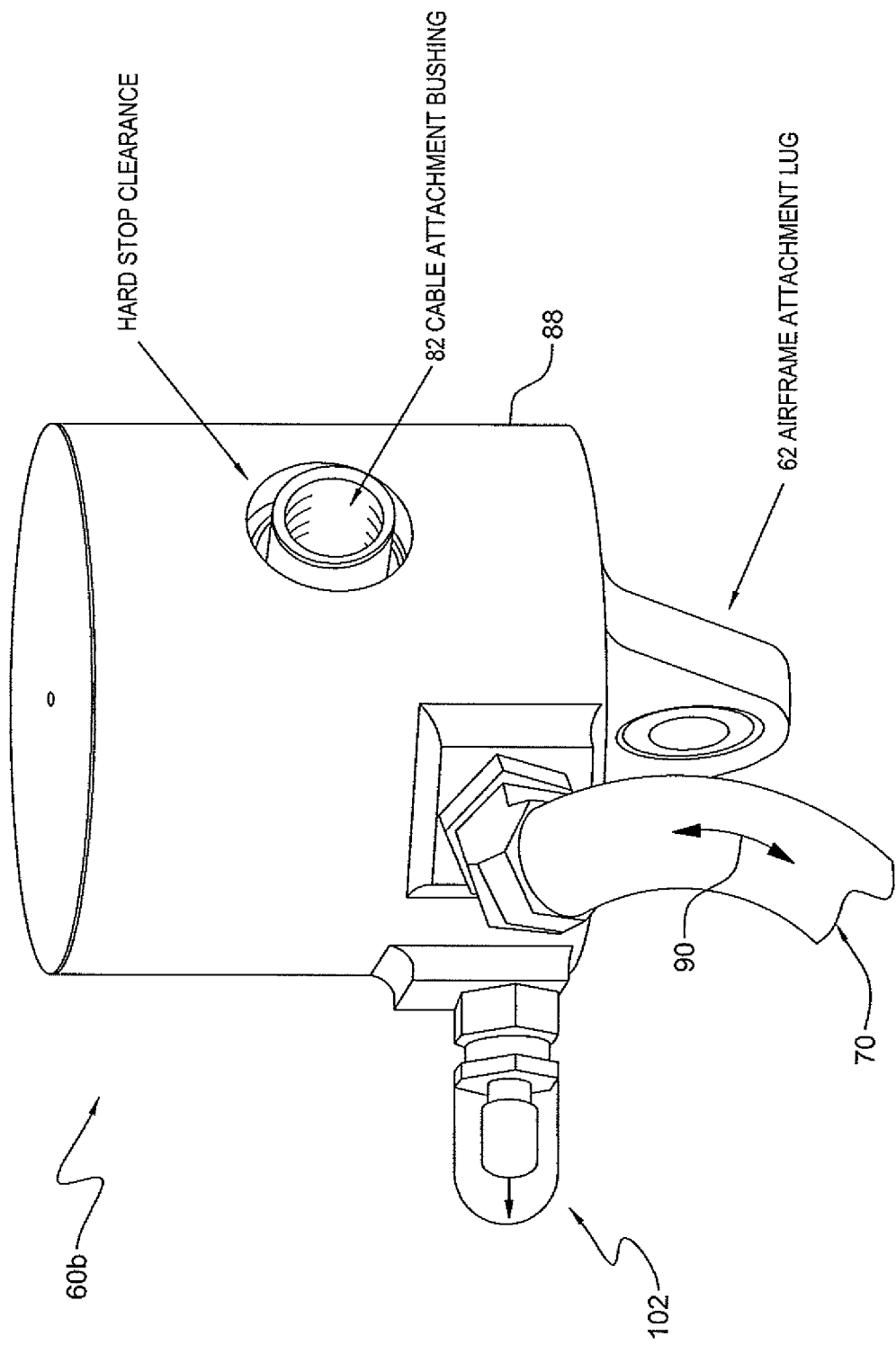
FIG. 8 illustrates a fluid mount and shows fluid motion in the fluid conduit.
Figure 9:
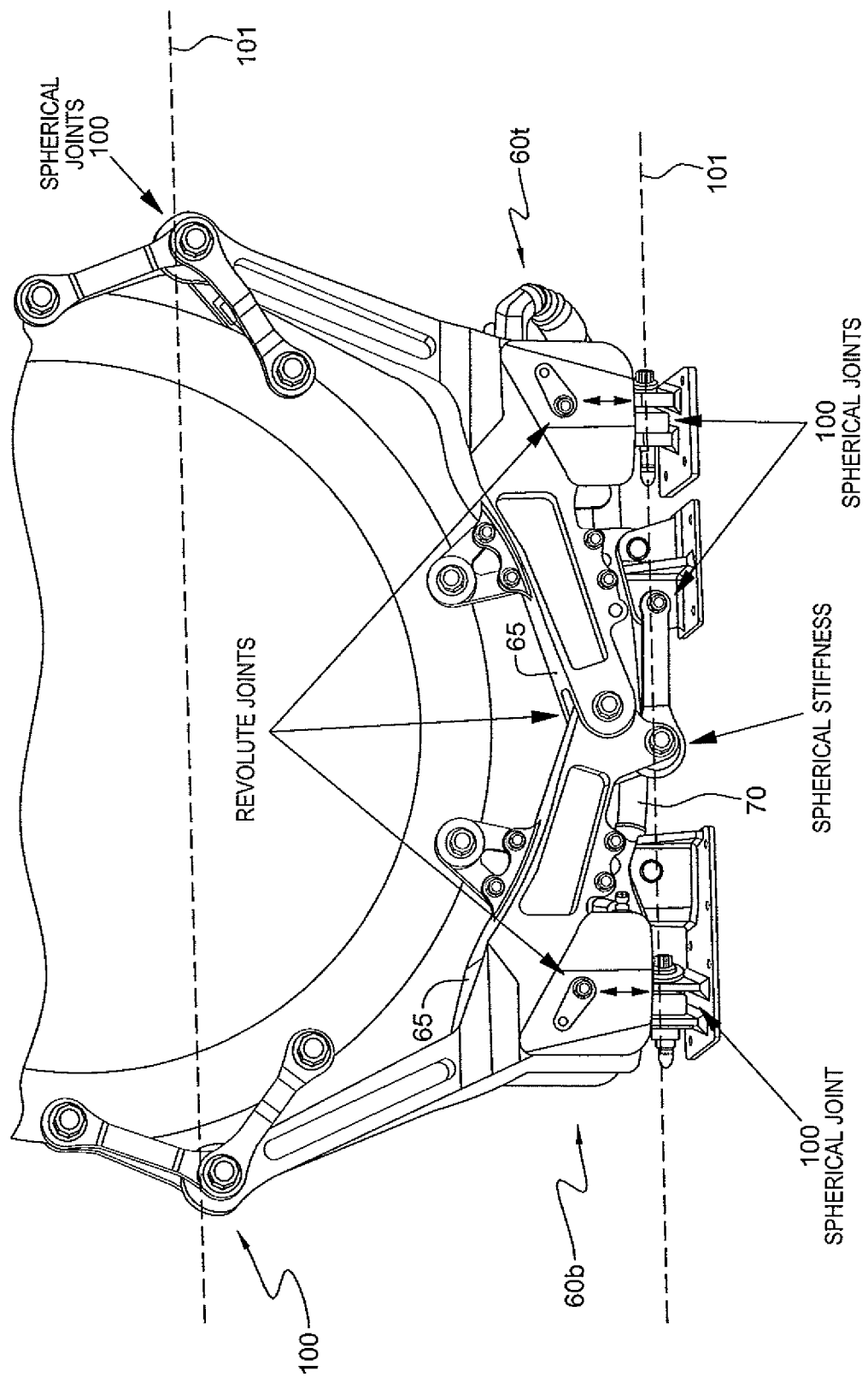
FIG. 9 illustrates the mounting system with the mounting system joints and hinge lines.
Figure 10:
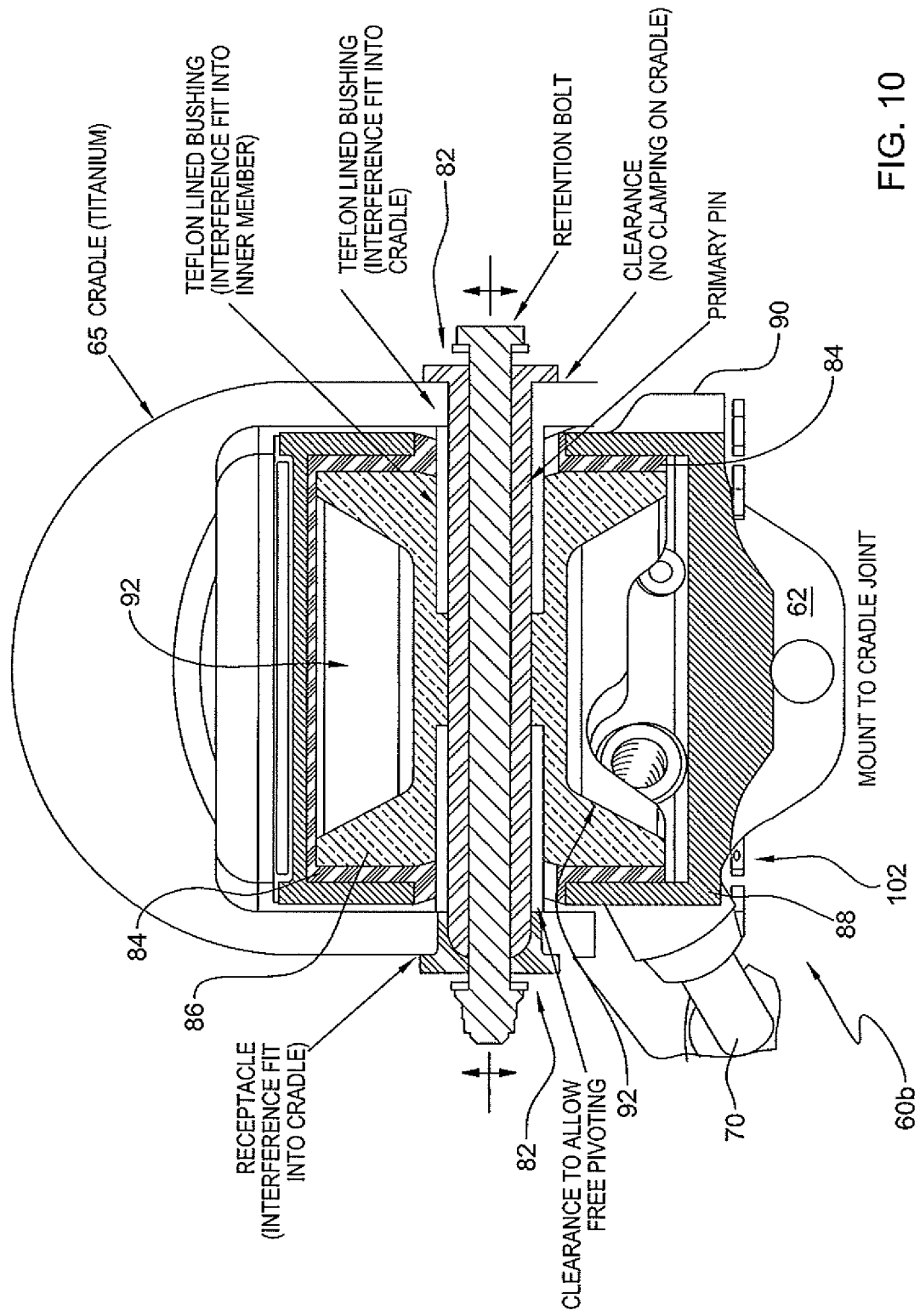
FIG. 10 illustrates the attachment of the fluid mount and fluid mount internals.
Figure 11:
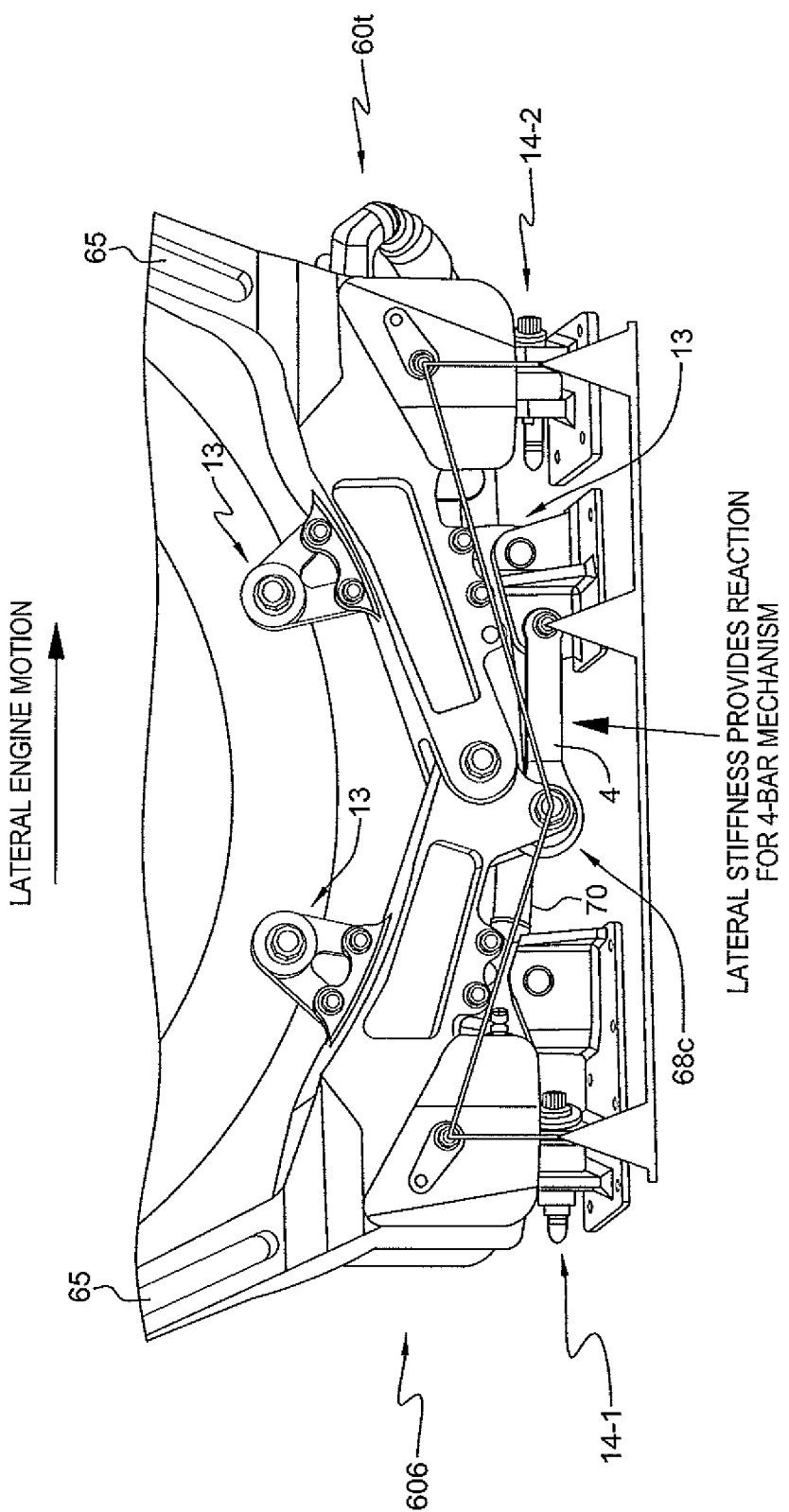
FIG. 11 illustrates a four bar system of the mounting system providing lateral stiffness.
Figure 12:
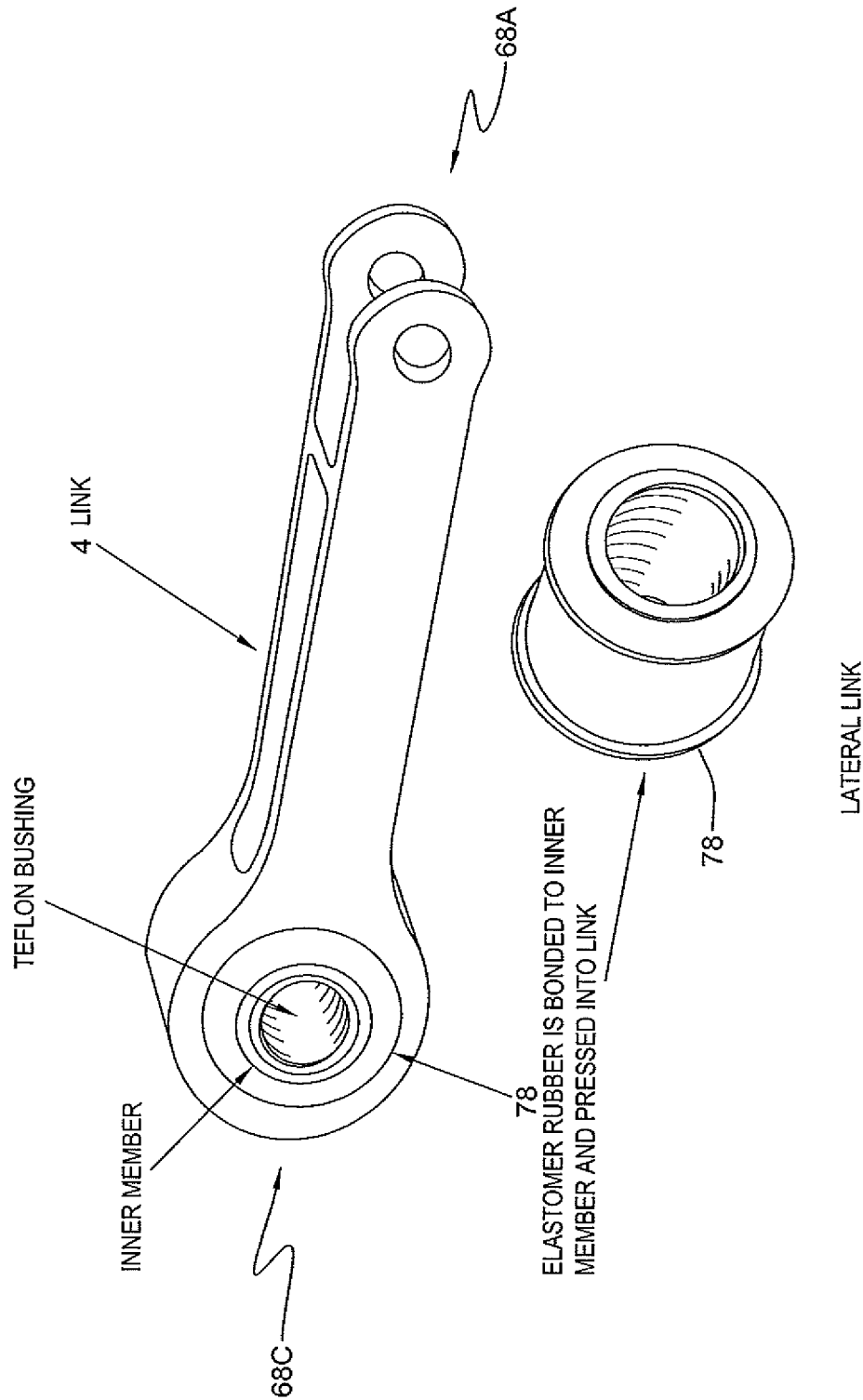
FIG. 12 illustrates a lateral link of the mounting system.
Figure 14:
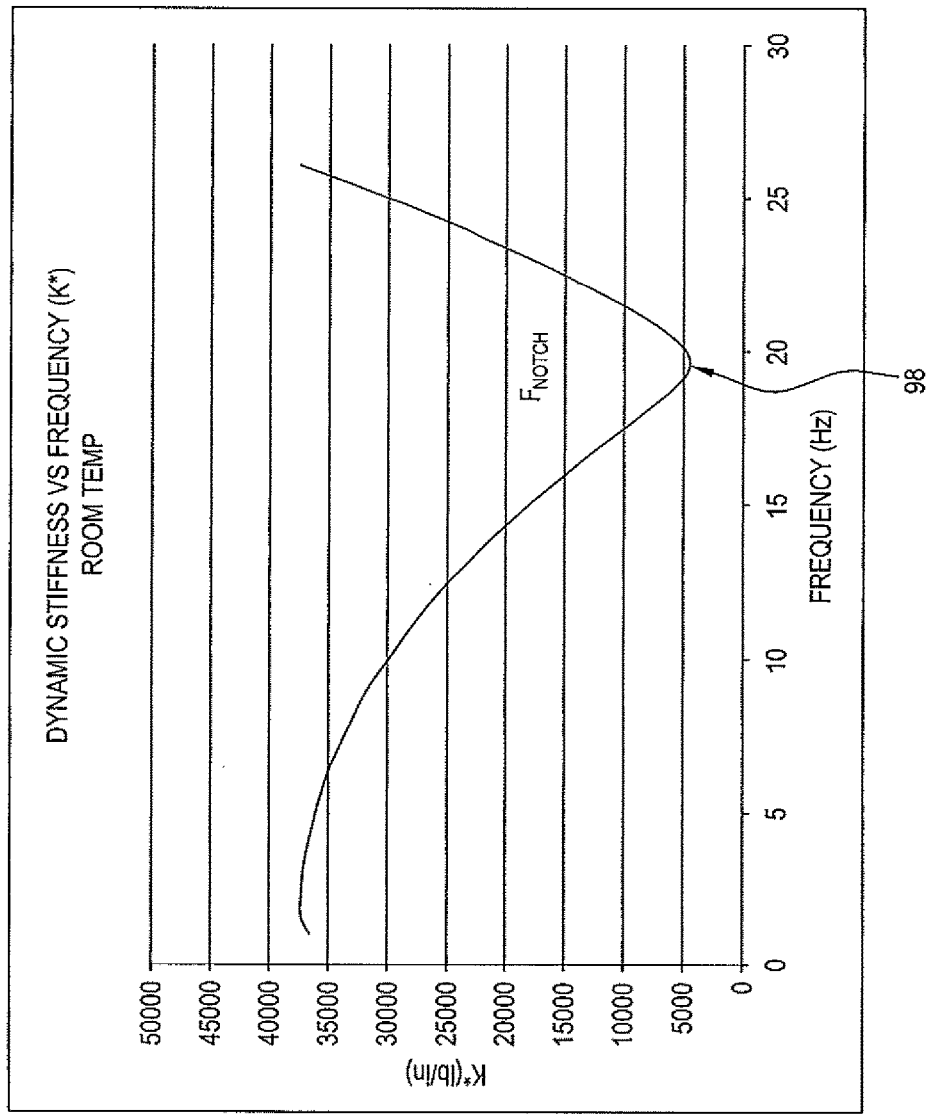
FIG. 14 is a graph of measured test data from a mounting system showing dynamic stiffness vs. frequency and the engine mount notch frequency.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a method of mounting a subject engine 50 in a rotary wing aircraft 52. The method includes providing a rotary wing aircraft 52 having an aircraft body 54 supported in flight through an exterior air space by a rotary wing system 56 rotating with an operational rotating frequency (P) with a plurality of (N) rotary wings 58, the rotary wing aircraft body 54 having a persistent in flight operational rotating frequency vibration. The method includes providing a first subject engine 50, the first engine 50 for providing power to rotate the rotary wing system 56 at the rotary wing system operational rotating frequency (P). The method includes providing a top fluid chamber fluid elastomer engine mount 60$t$ and a bottom fluid chamber fluid elastomer engine mount 60$b$, the top fluid chamber fluid elastomer engine mount 60$t$ having a bottom end 62 for grounding to the aircraft body 54, and the bottom fluid chamber fluid elastomer engine mount 60$b$ having a bottom end 62 for grounding to the aircraft body 54. The top fluid chamber fluid engine mount 60$t$ having a top fluid chamber 64$t$ distal from the top fluid chamber fluid mount bottom end 62, the bottom fluid chamber fluid engine mount 60$b$ having a bottom fluid chamber 64$b$ proximate the bottom fluid chamber fluid engine mount bottom end 62. The method includes providing an intermediate cradle 65, preferably with a first right cradle half 6 and a second left cradle half 5. The method includes providing a lateral link 4, the lateral link 4 having a first end 68$a$ for grounding to the aircraft body 54 and a second distal end 68$c$, the second distal end 68$c$ distal from the first end 68$a$. The method includes mounting the first engine 50 to the aircraft body 54, with the top fluid chamber fluid elastomer engine mount bottom end 62 grounded to the aircraft body 54, the bottom fluid chamber fluid elastomer engine mount bottom end 62 grounded to the aircraft body 54, with the intermediate cradle 65 disposed between the top fluid chamber fluid elastomer engine mount 60$t$ and the bottom fluid chamber fluid elastomer engine mount 60$b$ and the first engine 50, with a fluid conduit 70 connecting the top fluid chamber fluid engine mount top fluid chamber 64$t$ with the bottom fluid chamber fluid engine mount bottom fluid chamber 64$b$ wherein the rotary wing aircraft body persistent in flight operational rotating frequency vibration is inhibited from reaching the first engine 50.

Preferably the method includes attaching the lateral link first end 68$a$ to the aircraft body 54 and attaching the second distal end 68$c$ to the intermediate cradle 65. Preferably the second distal end 68$c$ is attached to the intermediate cradle 65 between the top fluid chamber fluid engine mount 60$t$ and the bottom fluid chamber fluid engine mount 60$b$, preferably proximate a midpoint between the mounts 60, preferably proximate a cradle joint 9 (preferably with cradle joint 9 connecting the cradle halfs 6,5), preferably with a lateral link joint 10.

Preferably the method includes disposing at least a first scissor link 72 between the intermediate cradle 65 and the first engine 50. Preferably a first scissor link 72 is provided for linking the intermediate cradle first upper arm 74 to the engine 50 and a second scissor link 72' is provided for linking the intermediate cradle second upper arm 74' to the engine 50. Preferably the scissor links are comprised of an upper scissor link 2 and a lower scissor link 3.

Preferably the at least first scissor link 72 is attached to the intermediate cradle arm 74 and an engine frame 76 of the first engine 50, preferably with a cradle to scissor link joint 8, preferably with the cradle to scissor link joints 8 are comprised of a spherical joint between the cradle upper arm end and the scissor link with upper scissor link 2 and lower scissor link 3. Preferably the scissors links are connected with the engine 50 and its engine frame 76 with scissor link to engine joints 11, and preferably a scissor link eye bolt 12. Preferably the system 1 includes failsafes 13, preferably waiting failsafes 13 between the cradle 65 and the engine frame 76. Preferably the failsafe 13 are comprise of a failsafe pin received inside a failsafe hole, with a failsafe clearance between the pin and hole provising for the fail safe to be nonconnected and waiting to connect and engage each other upon a failure.

Preferably the intermediate cradle 65 is comprised of the cradle halfs 6,5 joined together with cradle joint 9, preferably with intermediate cradle center cradle joint 9 comprised of a center cradle revolute joint.

Preferably the intermediate cradle center cradle joint 9 is a revolute joint disposed between the top fluid chamber fluid engine mount 60$t$ and the bottom fluid chamber fluid engine mount 60$b$. Preferably with the method static determinacy is provided for the engine mounting system 1.

Preferably the lateral link second distal end 68$c$ is attached to the intermediate cradle 65 proximate the center cradle joint 9, preferably between the top fluid chamber fluid engine mount 60$t$ and the bottom fluid chamber fluid engine mount 60$b$, and between the engine frame 76 and the aircraft body 54.

Preferably the lateral link second distal end 68$c$ is attached to the intermediate cradle 65 proximate the center cradle joint 9 through an elastomer 78.

Preferably the method includes attaching the intermediate cradle 65 to the top fluid chamber fluid engine mount 60$t$ with a revolute joint 7 providing a mount to cradle joint and attaching the intermediate cradle 65 to the bottom fluid chamber fluid engine mount 60$b$ with a revolute joint 7 providing a mount to cradle joint.

Preferably the engine 50 has a longitudinally extending center line 80, the longitudinally extending center line extending longitudinally fore and aft in the aircraft 52, with an intermediate cradle center cradle joint 9 oriented relative to the longitudinally extending center line 80, with the intermediate cradle center cradle joint 9 disposed between the top fluid chamber fluid engine mount 60$t$ and the bottom fluid chamber fluid engine mount 60$b$, preferably with static determinacy provided for the engine mounting system 1.

Preferably the method includes providing a plurality of spherical joints 100 to provide an engine mount system fore/aft degree of freedom, preferably with a lower hinge line 101 and an upper hinge line 101.

Preferably the method includes providing a pressure sensor 102 for sensing the pressure of the fluid 90.

Preferably with the intermediate cradle 65 is disposed between the top fluid chamber fluid elastomer engine mount 60$t$ and the bottom fluid chamber fluid elastomer engine mount 60$b$ and the first engine 50, with the fluid conduit 70 connecting the top fluid chamber fluid engine mount top fluid chamber 64$t$ with the bottom fluid chamber fluid engine mount bottom fluid chamber 64$b$ the fluid 90 in the mounts and conduit oscillates back and forth and is tuned in relationship to the frequency of the rotary wing aircraft body persistent in flight operational rotating frequency vibration to provide a engine mount notch frequency 98 centered about the in flight operational rotating frequency vibration NP with transmission of such in flight operational rotating frequency vibration NP through the engine mounting system 1 from the aircraft body 54 into the engine 50 inhibited. In a preferred embodiment with a helicopter with seven rotating blades the notch 98 frequency is centered about 21 Hz with the operational rotating frequency (P) of the helicopter about 3 Hz producing persistent in flight operational rotating frequency vibration from the rotating blades in the aircraft body 54 centered about 21 Hz. In a preferred embodiment the notch 98 frequency is tuned and centered about 19.5 Hz with the notch substantially including 21 Hz. The Dynamic Stiffness vs Frequency (K*) plot of Frequency (Hz) on the x axis and K* (lb/in) on the y axis is a plot of measured test data for a system 1 tuned at about 19.5 Hz. The variable volume of the chambers 64t,64b from the variable position of the cradle attachment bushing 82 relative to the mount bottom end 62 provided with the bonded elastomer 84 bonded between the mount nonelastomeric inner member 86 and the mount nonelastomeric outer member 88 pump and oscilate the inertia fluid 90 back and forth between the chambers 64t,64b through the inertia fluid conduit 70. The pumping and oscilating of the inertia fluid 90 back and forth between the chambers 64t,64b through the inertia fluid conduit 70 preferably generates fluid inertia forces for changing the mount operating characteristics at the persistent in flight operational rotating frequency vibration from the rotating blades in the aircraft wherein the rotary wing aircraft body persistent in flight operational rotating frequency vibration is inhibited from reaching the first engine 50 with the variable volume chambers 64t,64b and the variable position of the cradle attachment bushing 82 relative to the mount bottom end 62 inhibiting the transmission of the rotary wing aircraft body persistent in flight operational rotating frequency vibration from the body 54 up into the engine 50. Preferably the inner member 86 has an upper and a lower concavity 92. Preferably in the top fluid chamber fluid elastomer engine mount 60t the upper concavity 92 provides fluid chamber 64t and contains fluid 90 and the lower concavity 92 does not provide a fluid chamber and does not contain a fluid 90. Preferably in the bottom fluid chamber fluid elastomer engine mount 60b the lower concavity 92 provides fluid chamber 64b and contains fluid 90 and the upper concavity 92 does not provide a fluid chamber and does not contain a fluid 90. Preferably the conduit 70 provides an inertia track for the fluid 90 that confines and directs the fluid between the variable volume of the chambers 64t,64b. The oscillation of the fluid 90 within the inertia track conduit 70 provides an inertence mass like resistance to the mount inner member outer member pumping forces which is in phase with the input disturbance displacement and opposite in direction to the input acceleration. The inertial forces of the oscillating fluid reduces the dynamic stiffness of the mounts 60 at the predetermined frequency of the persistent in flight operational rotating frequency vibration from the rotating blades in the aircraft. In preferred embodiments different lengths (at least a first length and at least a second length) of the conduit 70 are provided to tune the inertial forces of the oscillating fluid in the conduit to tune the oscillating fluid reduced dynamic stiffness of the mounts 64 to correlate with the frequency of the persistent in flight operational rotating frequency vibration from the rotating blades in the aircraft.

Preferably the mount bottom ends 62 are connected and grounded to the aircraft body 54 with mount to airframe body grounding joints 14-1,14-2. Preferably top fluid mount 60t is protected from heat by a heat shield 15. Preferably bottom fluid mount 60b is protected from heat by a heat shield 16.

In an embodiment the invention includes a helicopter engine mounting system 1 for mounting an engine 50 to an aircraft body 54 supported in flight by a rotary wing system 56 rotating with an operational rotating frequency (P) with a plurality of (N) rotating blades 58, the aircraft body 54 having a persistent in flight operational rotating frequency vibration from the rotating blades 58. The engine mounting system includes a top fluid chamber fluid elastomer engine mount 60t and a bottom fluid chamber fluid elastomer engine mount 60b, the top fluid chamber fluid elastomer engine mount 60t having a bottom end 62 for grounding to the aircraft body 54, and the bottom fluid chamber fluid elastomer engine mount 60b having a bottom end 62 for grounding to the aircraft body 54, the top fluid chamber fluid elastomer engine mount having a top fluid chamber 64t distal from the top fluid chamber fluid elastomer engine mount bottom end 62, the bottom fluid chamber fluid elastomer engine mount having a bottom fluid chamber 64b proximate the bottom fluid chamber fluid elastomer engine mount bottom end 62. The engine mounting system 1 includes an intermediate cradle 65 with a lateral link 4, the lateral link 4 having a first end 68a for grounding to the aircraft body 54 and a second distal end 68c, the second distal end 68c distal from the first end 68a, the second distal end 68c linked to the intermediate cradle 65. The top fluid chamber fluid elastomer engine mount bottom end 62 grounded to the aircraft body 54, the bottom fluid chamber fluid elastomer engine mount bottom end 62 grounded to the aircraft body 54, with the intermediate cradle 65 disposed between the top fluid chamber fluid elastomer engine mount 60t and the bottom fluid chamber fluid elastomer engine mount 60b and the engine 50, with a fluid conduit 70 connecting the top fluid chamber fluid engine mount top fluid chamber 64t with the bottom fluid chamber fluid engine mount bottom fluid chamber 64b wherein a transfer of the persistent in flight operational rotating frequency vibration from the aircraft body 54 to the engine 50 is inhibited. The variable volume of the chambers 64t,64b from the variable position of the cradle attachment bushing 82 relative to the mount bottom end 62 provided with the bonded elastomer 84 bonded between the mount inner member 86 and the mount outer member 88 pump and oscilate the inertia fluid 90 back and forth between the chambers 64t,64b through the inertia fluid conduit 70. The pumping and oscilating of the inertia fluid 90 back and forth between the chambers 64t,64b through the inertia fluid conduit 70 preferably generates fluid inertia forces for changing the mount operating characteristics at the persistent in flight operational rotating frequency vibration from the rotating blades in the aircraft wherein the rotary wing aircraft body persistent in flight operational rotating frequency vibration is inhibited from reaching the first engine 50 with the variable volume chambers 64t,64b and the variable position of the cradle attachment bushing 82 relative to the mount bottom end 62 inhibiting the transmission of the rotary wing aircraft body persistent in flight operational rotating frequency vibration from the body 54 up into the engine 50. Preferably the inner member 86 has an upper and a lower concavity 92. Preferably in the top fluid chamber fluid elastomer engine mount 60t the upper concavity 92 provides fluid chamber 64t and the lower concavity 92 does not provide a fluid chamber. Preferably in the bottom fluid chamber fluid elastomer engine mount 60b the lower concavity 92 provides fluid chamber 64b and the upper concavity 92 does not provide a fluid chamber. Preferably the conduit 70 provides an inertia track for the fluid 90 that confines and directs the fluid between the variable volume of the chambers 64t,64b. The oscillation of the fluid 90 within the inertia track conduit 70 provides an inertence mass like resistance to the mount inner member outer member pumping forces which is in phase with the input disturbance displacement and opposite in direction to the input acceleration. The inertial forces of the oscillating fluid reduces the dynamic stiffness of the mounts 64 at the predetermined frequency of the the persistent in flight operational rotating frequency vibration from the rotating blades in the aircraft. In preferred embodiments different lengths (at least a first length and at least a second length) of the conduit 70 are provided to tune the inertial forces of the oscillating fluid in the conduit to tune the oscillating fluid reduced dynamic stiffness of the mounts 64 to correlate with the frequency of the the persistent in flight operational rotating frequency vibration from the rotating blades in the aircraft.

Preferably the lateral link second distal end 68c is attached to the intermediate cradle 65 between the top fluid chamber fluid engine mount 60t and the bottom fluid chamber fluid engine mount 60b.

Preferably the system 1 includes at least a first scissor link 72 between the intermediate cradle 65 and the engine 50.

Preferably the at least first scissor link 72 is attached to the intermediate cradle 65 and an encircling engine frame 76 of the engine 50, preferably with a spherical joint 100 between cradle upper arm end and scissor link with upper scissor link 2 and lower scissor link 3.

Preferably the engine 50 has a longitudinally extending center line 80, the longitudinally extending center line 80 extending longitudinally fore and aft in the aircraft 52, and the intermediate cradle 65 includes a center cradle revolute joint 9 oriented relative to the longitudinally extending center line 80.

Preferably the intermediate cradle center cradle joint 9 is a revolute joint disposed below the longitudinally extending center line 80 and between the top fluid chamber fluid engine mount 60t and the bottom fluid chamber fluid engine mount 60b, preferably with static determinacy provided for the engine mounting system 1.

Preferably the lateral link second distal end 68c is attached to the intermediate cradle 65 proximate the center cradle joint 9. Preferably the lateral link second distal end 68c is attached between the top fluid chamber fluid engine mount 60t and the bottom fluid chamber fluid engine mount 60b, and between the engine frame 76 and the aircraft body 54. Preferably the lateral link second distal end 68c is attached to the intermediate cradle 65 proximate the center cradle joint 9 through an elastomer 78.

Preferably the intermediate cradle 65 is attached to the top fluid chamber fluid engine mount 60t with a revolute joint 7 and is attached to the bottom fluid chamber fluid engine mount 60b with a revolute joint 7.

Preferably the engine 50 has a longitudinally extending center line 80, the longitudinally extending center line 80 extending longitudinally fore and aft in the aircraft 52, with an intermediate cradle center cradle joint 9 oriented relative to the longitudinally extending center line 80, with the intermediate cradle center cradle joint 9 disposed between the top fluid chamber fluid engine mount 60t and the bottom fluid chamber fluid engine mount 60b. Preferably static determinacy is provided for the engine mounting system 1.

Preferably the system includes a plurality of spherical joints 100 to provide an engine mount system fore/aft degree of freedom, preferably with a lower hinge line 101 and an upper hinge line 101.

Preferably the system includes a pressure sensor 102 for sensing the pressure of the fluid 90.

Preferably with the system 1 the intermediate cradle 65 is disposed between the top fluid chamber fluid elastomer engine mount 60t and the bottom fluid chamber fluid elastomer engine mount 60b and the first engine 50, with the fluid conduit 70 connecting the top fluid chamber fluid engine mount top fluid chamber 64t with the bottom fluid chamber fluid engine mount bottom fluid chamber 64b with the fluid 90 in the mounts 60 and conduit 70 oscillating back and forth in a tuned relationship with the frequency of the rotary wing aircraft body persistent in flight operational rotating frequency vibration to provide a engine mount notch frequency 98 centered about the in flight operational rotating frequency vibration NP with transmission of such in flight operational rotating frequency vibration NP through the engine mounting system 1 in a direction from the aircraft body 54 into the engine 50 inhibited. In a preferred embodiment with a helicopter 52 with seven rotating blades 58 the notch 98 frequency is centered about 21 Hz with the operational rotating frequency (P) of the helicopter 52 about 3 Hz producing persistent in flight operational rotating frequency vibration from the rotating blades 58 in the aircraft body 54 centered about 21 Hz. In a preferred embodiment the notch 98 frequency is tuned and centered about 19.5 Hz with the notch substantially including 21 Hz. The Dynamic Stiffness vs Frequency (K*) plot of Frequency (Hz) on the x axis and K* (lb/in) on the y axis is a plot of measured test data for a system 1 tuned at about 19.5 Hz.

In an embodiment the invention includes a method of making an engine mounting system 1 for an engine 50 in an aircraft body 54 having a persistent in flight operational rotating frequency vibration. The method includes providing a top fluid chamber fluid elastomer engine mount 60t and a bottom fluid chamber fluid elastomer engine mount 60b, the top fluid chamber fluid elastomer engine mount 60t having a bottom end 62 for grounding to the aircraft body 54, and the bottom fluid chamber fluid elastomer engine mount 60b having a bottom end 62 for grounding to the aircraft body 54, the top fluid chamber fluid elastomer engine mount 60t having a top fluid chamber 64t distal from the top fluid chamber fluid elastomer engine mount bottom end 62, the bottom fluid chamber fluid elastomer engine mount 60b having a bottom fluid chamber 64b proximate the bottom fluid chamber fluid elastomer engine mount bottom end 62. The method includes providing an intermediate cradle 65 with a center cradle revolute joint 9. The method includes providing a lateral link 4, the lateral link 4 having a first end 68a for grounding to the aircraft body 54 and a second distal end 68c, the second distal end 68c distal from the first end 68a for linking to the intermediate cradle 65. The method includes the intermediate cradle 65 attachable between the engine 50 and the top fluid chamber fluid engine mount bottom end 62 and the bottom fluid chamber fluid engine mount bottom end 62 with the intermediate cradle center cradle revolute joint 9 between the top fluid chamber fluid engine mount 60t and the bottom fluid chamber fluid engine mount 60t with a fluid conduit 70 connecting the top fluid chamber fluid engine mount top fluid chamber 64t with the bottom fluid chamber fluid engine mount bottom fluid chamber 64b wherein the aircraft body persistent in flight operational rotating frequency vibration is inhibited from reaching the engine 50 by a mass of fluid 90 resonating between the top fluid chamber fluid engine mount top fluid chamber 64t and the bottom fluid chamber fluid engine mount bottom fluid chamber 64b.

In a preferred embodiment with a helicopter 52 with seven rotating blades 58 the transmission of the NP 21 Hz persistent in flight operational rotating frequency vibration through the engine mounts 60 is inhibited by the tuned notch 98 filter of the fluid mass 90 oscillating between the mounts 60 which combines in an out of phase manner with the elastomer response of the mounts, with the tuned notch 98 filter center about the NP 21 Hz troublesome vibration.

Preferably the intermediate cradle center cradle joint 9 is a revolute joint disposed between the top fluid chamber fluid engine mount 60t and the bottom fluid chamber fluid engine mount 60b wherein static determinacy is provided for the engine mounting system 1.

Preferably the method includes attaching the second distal end 68c of the link 4 to the intermediate cradle 65 through an elastomer member 78 between the top fluid chamber fluid engine mount 60t and the bottom fluid chamber fluid engine mount 60b.

Preferably the method includes providing a first scissor link 72 and a second scissor link 72' between the intermediate cradle 65 and the engine 50.

Preferably the scissor links 72, 72' are attached to the intermediate cradle 65 and an engine frame 76 of the first engine 50 with a spherical joint 100 between the cradle 65 and scissor link.

Preferably the lateral link second distal end 68c is attached to the intermediate cradle 65 proximate the center cradle joint 9, preferably between the top fluid chamber fluid engine mount 60t and the bottom fluid chamber fluid engine mount 60b, and between the engine frame 76 and the aircraft body 54.

Preferably the intermediate cradle 65 is attached to the top fluid chamber fluid engine mount 60t with a revolute joint 7 and the intermediate cradle 65 is attached to the bottom fluid chamber fluid engine mount 60b with a revolute joint 7.

Preferably the engine 50 has a longitudinally extending center line 80, the longitudinally extending center line 80 extending longitudinally fore and aft in the aircraft 52, with the intermediate cradle center cradle joint 9 oriented relative to the longitudinally extending center line 80, with the intermediate cradle center cradle joint 9 disposed between the top fluid chamber fluid engine mount 60t and the bottom fluid chamber fluid engine mount 60b, preferably with static determinacy provided for the engine mounting system 1.

Preferably the method includes providing a plurality of spherical joints 100 to provide an engine mount system fore/aft degree of freedom, preferably with a lower hinge line 101 and an upper hinge line 101.

Preferably the method includes providing a pressure sensor 102 for sensing the pressure of the fluid 90.

Preferably with the intermediate cradle 65 disposed between the top fluid chamber fluid elastomer engine mount 60t and the bottom fluid chamber fluid elastomer engine mount 60b and the engine 50, with the fluid conduit 70 connecting the top fluid chamber fluid engine mount top fluid chamber 64t with the bottom fluid chamber fluid engine mount bottom fluid chamber 64b the fluid 90 in the fluid elastomer mounts 60 and conduit 70 oscillates back and forth and is tuned in relationship to the frequency of the rotary wing aircraft body persistent in flight operational rotating frequency vibration to provide a engine mount notch 98 frequency centered about the in flight operational rotating frequency vibration NP with transmission of such in flight operational rotating frequency vibration NP through the engine mounting system from the aircraft body 54 into the engine 50 inhibited. In a preferred embodiment with a helicopter 52 with seven rotating blades 58 the notch 98 frequency is centered about 21 Hz with the operational rotating frequency (P) of the helicopter about 3 Hz producing persistent in flight operational rotating frequency vibration from the rotating blades in the aircraft body 54 centered about 21 Hz. In a preferred embodiment the notch 98 frequency is tuned and centered about 19.5 Hz with the notch substantially including 21 Hz. The Dynamic Stiffness vs Frequency (K*) plot of Frequency (Hz) on the x axis and K* (lb/in) on the y axis is a plot of measured test data for a system 1 tuned at about 19.5 Hz.

In an embodiment the invention includes a method of making a mounting system for mounting a subject. The method includes providing a top fluid chamber fluid mount and a bottom fluid chamber fluid mount, said top fluid chamber fluid mount having a bottom end for grounding to a body, and said bottom fluid chamber fluid mount having a bottom end for grounding to said body, said top fluid chamber fluid mount having a top fluid chamber distal from said top fluid chamber fluid mount bottom end, said bottom fluid chamber fluid mount having a bottom fluid chamber proximate said bottom fluid chamber fluid mount bottom end. The method includes providing an intermediate cradle with a center cradle revolute joint. The method includes providing a lateral link, said lateral link having a first end for grounding to said body and a second distal end, said second distal end distal from said first end for linking to said intermediate cradle, said intermediate cradle attachable between said subject and said top fluid chamber fluid mount and said bottom fluid chamber fluid mount with said intermediate cradle center cradle revolute joint between said top fluid chamber fluid mount and said bottom fluid chamber fluid mount with a fluid conduit connecting said top fluid chamber fluid mount top fluid chamber with said bottom fluid chamber fluid mount bottom fluid chamber wherein frequency notch vibrations are inhibited from transmission through said mounting system mounting said subject to said body by a mass of fluid moving between said top fluid chamber fluid mount top fluid chamber and said bottom fluid chamber fluid mount bottom fluid chamber. The mounting system preferably provides static determancy wherein preferably all loads can be calculated by hand calculations of force, moment, and balance.

In an embodiment the invention includes an engine mount assembly 1 for mounting a subject engine 50 which produces a torque to an aircraft body 54 having a persistent troublesome frequency vibration. The engine mount assembly 1 including a first side fluid chamber fluid elastomer engine mount 60 and a second side fluid chamber fluid elastomer engine mount 60, the first side fluid chamber fluid elastomer engine mount groundable to the body 54 having the persistent troublesome frequency vibration, and the second side fluid chamber fluid elastomer engine mount groundable to the body 54 having the persistent troublesome frequency vibration, the first side fluid chamber fluid elastomer engine mount having a first fluid chamber 64, the second side fluid chamber fluid elastomer engine mount having a second fluid chamber 64. The engine mount assembly including an intermediate cradle 65 with a lateral link 4, the lateral link having a first end 68a for grounding to the body 54 having the persistent troublesome frequency vibration and a second distal end 68c, the second distal end distal from the first end, the second distal end linked to the intermediate cradle 65. The first side fluid chamber fluid elastomer engine mount 60 is grounded to the body 54 having the persistent troublesome frequency vibration, the second side fluid chamber fluid elastomer engine mount 60 grounded to the body 54 having the persistent troublesome frequency vibration, with the intermediate cradle 65 disposed between the first fluid chamber fluid engine mount and the second side fluid chamber fluid engine mount and the engine, with a fluid conduit 70 connecting the first side fluid chamber fluid engine mount fluid chamber 64 with the second side fluid chamber fluid engine mount fluid chamber 64 wherein the torque generates a positive fluid pressure within the fluid chambers 64 and the fluid conduit and the intermediate cradle 65 has an intermediate cradle center cradle joint between the first side fluid chamber fluid elastomer engine mount and the second side fluid chamber fluid elastomer engine mount with the first side fluid chamber fluid elastomer engine mount and the second side fluid chamber fluid elastomer engine mount sharing a plurality of loads while a transfer of the persistent troublesome frequency vibration from the body 54 to the engine 50 is inhibited.

Preferably the first side fluid chamber fluid elastomer engine mount 60 has a first fluid elastomer mount primary line of action 96 and the second side fluid chamber fluid elastomer engine mount 60 has a second fluid elastomer mount primary line of action 96 with the first fluid elastomer mount primary line of action substantially parallel with the second fluid elastomer mount primary line of action.

Preferably the engine torque generating positive fluid pressure within the fluid chambers 64 and the fluid conduit 70 inhibits a fluid cavitation in the first side fluid chamber fluid elastomer engine mount and the second side fluid chamber fluid elastomer engine mount during a plurality of translation vibration isolation movements of the assembly.

Preferably a stiffness of the assembly 1 in a second translation direction nonparallel with the force of gravity is controlled by the lateral link 4 with the assembly having a static determinacy.

Preferably the intermediate cradle 65 has a first side upper arm 74 providing a first side engine load application point, the first side upper arm first side engine load application point distal from the intermediate cradle center cradle joint 9 and a second side upper arm 74' providing a second side engine load application point, the second side upper arm second side engine load application point distal from the intermediate cradle center cradle joint 9.

Preferably a first side scissor link 72 is between the first side upper arm first side engine load application point and the engine 50 and a second side scissor link 72' between the second side upper arm second side engine load application point and the engine 50.

Preferably the intermediate cradle center cradle joint 9 is proximate the body 54.

Preferably the assembly 1 and the fluid conduit 70 and the first side fluid chamber fluid elastomer engine mount 60 and the second side fluid chamber fluid elastomer engine mount 60 are free of a fluid volume compensator chamber.

Preferably the assembly includes a pressure sensor 102 for sensing the pressure of the fluid 90.

Preferably the fluid elastomer engine isolation mounts 60 provide a high stiffness to torque produced by the engine 50 through the generation of hydrostatic pressure within the fluid chambers 64 and the connected conduit 70. Preferably at the same time the fluid elastomer engine isolation mounts 60 are soft to provide isolation in a primary translational direction, with the primary translational direction oriented parallel with gravity, with further reduction at the tuned notch 98 frequency. Preferably the primary translational direction is oriented parallel with gravity with this preferably being the direction of the highest static loads. Also, preferably at the same time the natural 1 G of load that is always present as a mean. To minimize deflections of the supported engine 50 higher stiffness is provided in the gravity direction as opposed to the perpendicular (nonparallel to gravity) direction with this higher stiffness preferably limiting deflections results with the tuned notch 98 frequency reducing the stiffness reduction in that direction at the persistent in flight operational rotating frequency vibration wherein a transmission of the persistent troublesome frequency vibration from the body 54 through the mounts 60 and into the engine 50 is inhibited.

Preferably the normal engine torque produces an addition of pressure within the mounts 60 as opposed to a negative pressure.

Preferably the two fluid elastomer engine isolation mounts 60 are oriented with their primary line of action 96 parallel with each other, and parallel with the primary maneuver load direction.

Preferably the positive hydrostatic pressure that is produced by the engine torque reaction generates fluid pressure to inhibit cavitation in the two fluid elastomer engine isolation mounts 60 due to fluctuations of dynamic pressures due to translational vibration isolation movements.

Preferably the two fluid elastomer engine isolation mounts isolators 60, cradle 65, and associated joints, provide a system/assembly/method wherein the stiffness in the second translational direction (preferably perpendicular to gravity) is controlled by the lateral link 4, preferably only by the lateral link 4 itself. Preferably this 4-bar system/assembly/method provides static determinacy for the engine isolation mounting system 1.

Preferably the center joint 9 in the intermediate cradle 65 provides freedom for engine 50 thermal growth, and tolerance stack, and preferably at the same time forces the first side and second side cradle halves 6,5 to share loads produced by aircraft maneuvers in the lateral and vertical directions and inhibits all lateral loads being supported on only one side of the engine 50.

Preferably the center cradle joint 9 is located distal and most preferably at an extreme distance as far from the engine load application point as possible. Preferably the center cradle joint 9 and the distal first side upper arm first side engine load application point 174 and the second side upper arm second side engine load application point 174' inhibits the amount of radial load produced on the engine attachment points due to aircraft maneuvers and torque.

Preferably the system/assembly/methods protect the engine 50 from the aircraft body persistent troublesome frequency vibration induced excitation at 21 Hz. That persistent troublesome frequency excitation which the system/assembly/methods inhibit the transmission of is produced by the 7P vibration of the main rotor of the helicopter and is transmitted throughout the airframe body 54.

The engine system/assembly/methods provide controlled stiffness that can be effectively sized and tuned to provide frequency placement and isolation. Preferably the rigid body modes of the engine 50 relative to the aircraft body 54 are maintained within the 8-15 Hz bandwidth, and with the torsional/roll modes close to 15 Hz, or above 27 Hz. Dynamically this preferably provides effective isolation of the 21 Hz excitation.

The engine system/assembly/methods utilize the mass of fluid 90 that is adjustable. With the mass of fluid 90 adjustable in the system/assembly, such as with adjustments to the fluid volume in the conduit 70 or fluid density of fluid 90, the system/assembly is tunable to effectively create a notch 98 in the dynamic stiffness at a specified frequency. This preferably provides a statically stiff system 1 which contains a dynamic notch 98 in response; and in a preferred seven blade helicopter embodiment tuned at about 21 Hz. In a preferred embodiment the notch 98 frequency is tuned and centered about 19.5 Hz with the notch substantially including 21 Hz. The Dynamic Stiffness vs Frequency (K*) plot of Frequency (Hz) on the x axis and K* (lb/in) on the y axis is a plot of measured test data for a system 1 tuned at about 19.5 Hz.

The engine system/assembly/methods provide a statically stiff and dynamically soft isolator system 1. Preferably the isolator 1 uses a tuned fluid mass 90 to create a notch 98 filter at a specified preferred frequency. The engine system/assembly mounts 60 have fluid chambers and passages for a small amount of fluid and takes advantage of the hydraulic pumping action of the bonded elastomer sections 84 and inner member 86 to transfer the fluid between the mounts. The response of the fluid 90 is tuned so that it combines in an out-of-phase manner with the elastomer response of bonded elastomer sections 84, resulting in increased vibration isolation at a given frequency. The engine system/assembly isolator mounts 60 provide for placement of the notch 98 frequency, Fnotch, at a desired frequency which coincides with a maximum tonal excitation band. In a preffered helicopter embodiment the mounts 60, conduit 70 and fluid inertia 90 are tuned to provide the notch 98 at the 7P excitation frequency of 21 Hz. In a preferred embodiment the notch 98 frequency is tuned and centered about 19.5 Hz with the notch substantially including 21 Hz. The Dynamic Stiffness vs Frequency (K*) plot of Frequency (Hz) on the x axis and K* (lb/in) on the y axis is a plot of measured test data for a system 1 tuned at about 19.5 Hz.

Preferably the system/assembly/methods utilize a high-pressure, braided, fluid hose as a fluid conduit 70 connected between the two fluid chambers 64. The mounts 60 are preferably installed inverted with respect to each other. Preferably one mount contains a fluid volume on top, while the other is on the bottom. As the engine isolation mount system 1 reacts torque, the fluid 90 is compressed within both mounts 60 and the hose conduit 70. This state of hydrostatic compression provides a very high effective stiffness to react the torsional load. The ability to tune is preferably provided by adjustments chosen from the tuning adjustment character group comprise of elastomer section thickness, elastomer modulus, fluid density, piston area, hose area, hose length (conduit interia track length), volume stiffness and combinations of such tuning adjustment characters.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. An engine mount assembly for mounting an engine which produces a torque to a body having a persistent troublesome frequency vibration, said engine mount assembly including a first side fluid chamber fluid elastomer engine mount and a second side fluid chamber fluid elastomer engine mount, said first side fluid chamber fluid elastomer engine mount groundable to said body having said persistent troublesome frequency vibration, and said second side fluid chamber fluid elastomer engine mount groundable to said body having said persistent troublesome frequency vibration, said first side fluid chamber fluid elastomer engine mount having a first fluid chamber, said second side fluid chamber fluid elastomer engine mount having a second fluid chamber, an intermediate cradle with a lateral link, said lateral link having a first end for grounding to said body having said persistent troublesome frequency vibration and a second distal end, said second distal end distal from said first end, said second distal end linked to said intermediate cradle, said first side fluid chamber fluid elastomer engine mount grounded to said body having said persistent troublesome frequency vibration, said second side fluid chamber fluid elastomer engine mount grounded to said body having said persistent troublesome frequency vibration, with said intermediate cradle disposed between said first fluid chamber fluid engine mount and said second side fluid chamber fluid engine mount and said engine, with a fluid conduit connecting said first side fluid chamber fluid engine mount fluid chamber with said second side fluid chamber fluid engine mount fluid chamber wherein said torque generates a positive fluid pressure within said fluid chambers and said fluid conduit and said intermediate cradle has an intermediate cradle center cradle joint between said first side fluid chamber fluid elastomer engine mount and said second side fluid chamber fluid elastomer engine mount with said first side fluid chamber fluid elastomer engine mount and said second side fluid chamber fluid elastomer engine mount sharing a plurality of loads while a transfer of said persistent troublesome frequency vibration from said body to said engine is inhibited.

2. An assembly as claimed in claim 1 wherein said first side fluid chamber fluid elastomer engine mount has a first fluid elastomer mount primary line of action and said second side fluid chamber fluid elastomer engine mount has a second fluid elastomer mount primary line of action with said first fluid elastomer mount primary line of action substantially parallel with said second fluid elastomer mount primary line of action.

3. An assembly as claimed in claim 1 wherein said engine torque generating positive fluid pressure within said fluid chambers and said fluid conduit inhibits a fluid cavitation in said first side fluid chamber fluid elastomer engine mount and said second side fluid chamber fluid elastomer engine mount during a plurality of translation vibration isolation movements of said assembly.

4. An assembly as claimed in claim 1 wherein a stiffness of said assembly in a second translation direction nonparallel with the force of gravity is controlled by said lateral link with said assembly having a static determinacy.

5. An assembly as claimed in claim 1 wherein said intermediate cradle has a first side upper arm providing a first side engine load application point, said first side upper arm first side engine load application point distal from said intermediate cradle center cradle joint and a second side upper arm providing a second side engine load application point, said second side upper arm second side engine load application point distal from said intermediate cradle center cradle joint.

6. An assembly as claimed in claim 5 with a first side scissor link between said first side upper arm first side engine load application point and said engine and a second side scissor link between said second side upper arm second side engine load application point and said engine.

7. An assembly as claimed in claim 5 wherein said intermediate cradle center cradle joint is proximate said body.

8. An assembly as claimed in claim 1 wherein said fluid conduit and said first side fluid chamber fluid elastomer engine mount and said second side fluid chamber fluid elastomer engine mount are free of a fluid volume compensator chamber.

9. An assembly as claimed in claim 1 wherein said assembly includes a pressure sensor for sensing the pressure of said fluid.

\* \* \* \* \*